April 23, 1968 F. P. INGLIMA 3,379,166

TAPE INDICATOR

Filed Aug. 30, 1965 3 Sheets-Sheet 1

INVENTOR.
FRANK P. INGLIMA
BY John Joseph Hall
ATTORNEY.

April 23, 1968 F. P. INGLIMA 3,379,166

TAPE INDICATOR

Filed Aug. 30, 1965 3 Sheets-Sheet 2

INVENTOR.
FRANK P. INGLIMA

INVENTOR.
FRANK P. INGLIMA
BY John Joseph Hall
ATTORNEY.

United States Patent Office 3,379,166

Patented Apr. 23, 1968

3,379,166

TAPE INDICATOR

Frank P. Inglima, 1370 N. Dominion Ave., Pasadena, Calif. 91104

Filed Aug. 30, 1965, Ser. No. 483,687
2 Claims. (Cl. 116—114)

ABSTRACT OF THE DISCLOSURE

A device capable of selectively raising recording tape as it is being reeled on a takeup reel to produce a misaligned portion of the tape which is higher than the remaining tape to indicate the location of desired recorded material on the tape, by means of an arm member which contacts the lower edge of the tape as it is being reeled and pushes it up, upon activation by the person operating the device.

This invention relates to improvements in tape indicators, and more particularly concerns an indicator device capable of indicating one or more locations on magnetic recording tape at the time of the recording for future reference.

Hitherto, tape indicators commercially available have been complicated in design and difficult to use as well as to assemble and manufacture. Further, such commercial tape indicators generally are dependent on the power supply of the tape-recorder.

It is, therefore, an object of this invention to provide a tape indicator which is relatively easy to assemble, manufacture, and use.

Another object of this invention is to provide a tape indicator which is interchangeable for use on different brands of commercially available tape recorders.

A further object of this invention is to provide a tape indicator which is independent of the power supply of the tape recorder and may also be manually operated as well as by a DC or AC or battery source.

A still further object of this invention is to provide a tape indicator which can be operated by a remote control.

These and other objects will be more readily understood by reference to the following specification, taken in conjunction with the accompanying drawings, in which:

FIGURE 1 is a perspective view of the complete assembly of the device mounted on the deck of a conventional tape recorder showing the lever 28 in extreme down position.

FIGURE 1*a* is a view similar to FIGURE 1 but shows the lever 28 in extreme up or rise position.

Figure 3A:
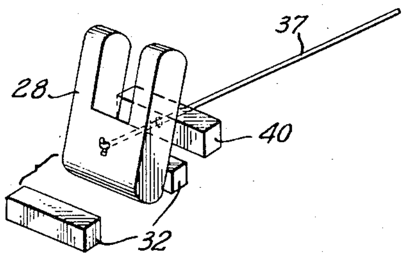
FIGURE 3 is a detail of the tape rise lever in phantom lines in extreme down position.
Figures 2, 3, 4, 5, 6:
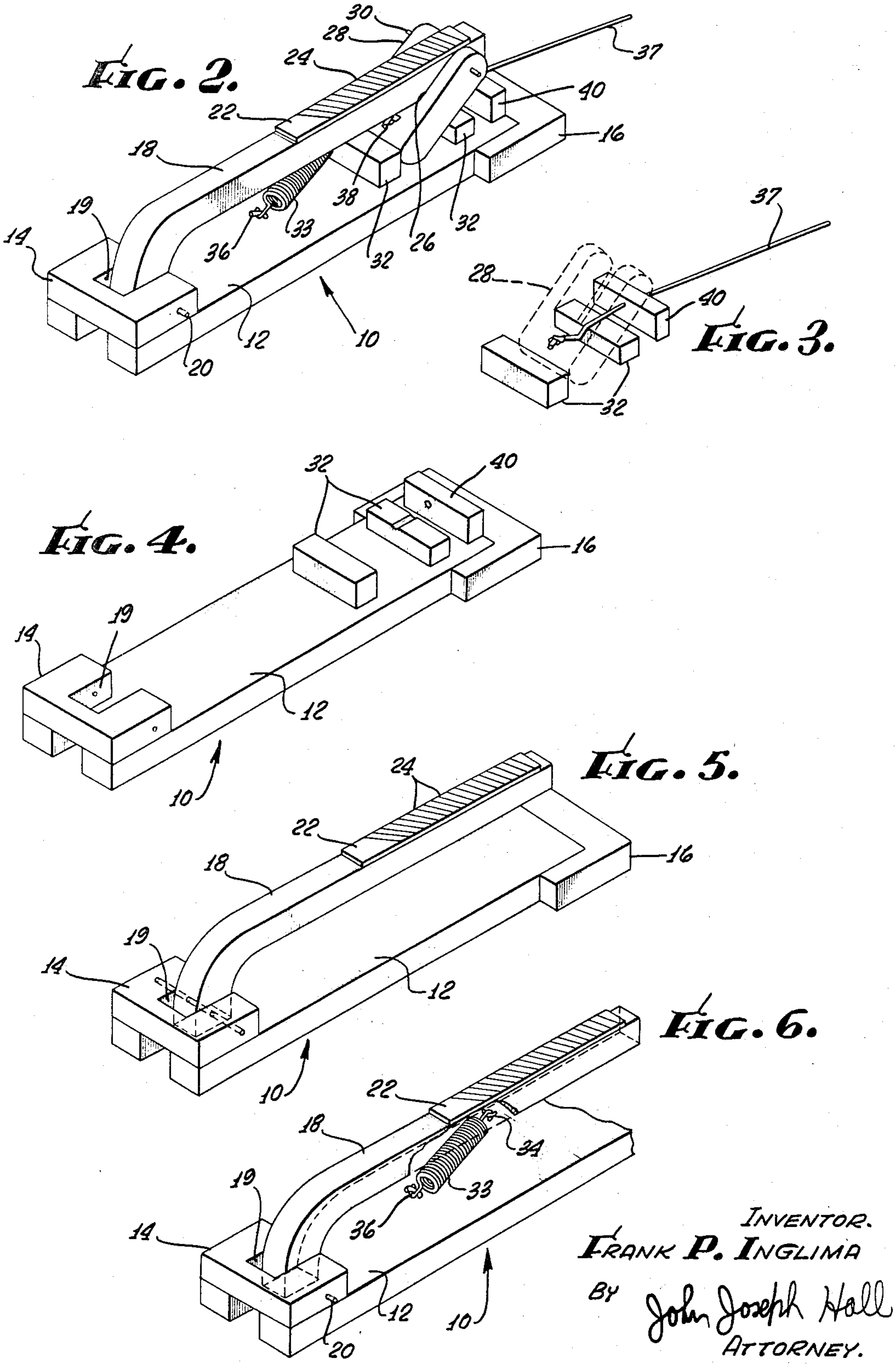
FIGURE 2 is a perspective view of the tape indicator device.

FIGURE 3*a* is a view similar to FIGURE 3 but shows the lever 28 in extreme up or rise position.

FIGURE 4 is a perspective view of the indicator base.

FIGURE 5 is a perspective view of the tape rise arm mounted on the indicator base.

FIGURE 6 is a view of FIGURE 5 showing the connection of spring means to the tape rise arm.

With reference to the construction of the tape indicator as disclosed in the drawings, the tape indicator 10 has a base 12 with pivot block 14 mounted thereon at one end and a position mount block 16 enclosing the other end. A tape rise arm 18 is received at its curved end by a groove 19 in the pivot block 14 and is pivotally mounted at its curved end in the pivot block 14 by pivot pin 20. The tape rise arm 18 has a grooved strip 22 of brass or other suitable material glued or otherwise mounted on the top of its straight end.

The grooves 24 in strip 22 are preferably $\frac{1}{16}$ of an inch apart and fan out to correspond with the various angles made by magnetic recording tape as it passes over the strip 22 unwinding from a full reel. The depth of the grooves preferably does not exceed $\frac{1}{64}$ of an inch and may be V shaped.

The straight end of the tape rise arm 18 is received by a groove 26 cut in the tape rise lever 28 and is pivotally mounted at the top portion of the tape rise lever 28 by pivot pin 30. Limit blocks 32 are cemented or otherwise mounted to the base 12.

One end of return spring 33 is attached at 34 to the underside of the tape rise arm 18, and the other end of return spring 33 is attached at 36 to the base 12.

A dial cord type or other suitable string 37 is attached at 38 to the tape rise lever 28 and passes over the first limit block 32 and through a hole in guide block 40 attached to the base 12 to an aircraft type or other suitable solenoid 42. The solenoid 42 is connected to a suitable power supply which preferably should have a normally open push button switch located at its output. Where DC power is used, a high resistance bleeder resistor (not shown) is advisable to discharge the filter capacitors of the power supply.

In operation, the tape indicator is able to mark one or more particular locations on magnetic recording tape at the time of recording for quick future reference. As the magnetic tape is being accumulated on the takeup reel of any conventional tape recorder, the tape indicator is placed below the tape as it is being accumulated so that the grooved strip 22 of the tape rise arm 18 is just below the tape. When the operator wants to mark a particular location on the tape, he depresses the button of the power supply, thereby activating the solenoid 42 which in turn pulls the string 37. The string 37 in turn forces the tape rise lever 28 to raise the tape rise arm 18. Lifted in this manner, the tape rise arm 18 makes contact with the lower edge of the tape being recorded and causes it to rise slightly higher than other parts of the tape being accumulated on the takeup reel.

Figure 1:
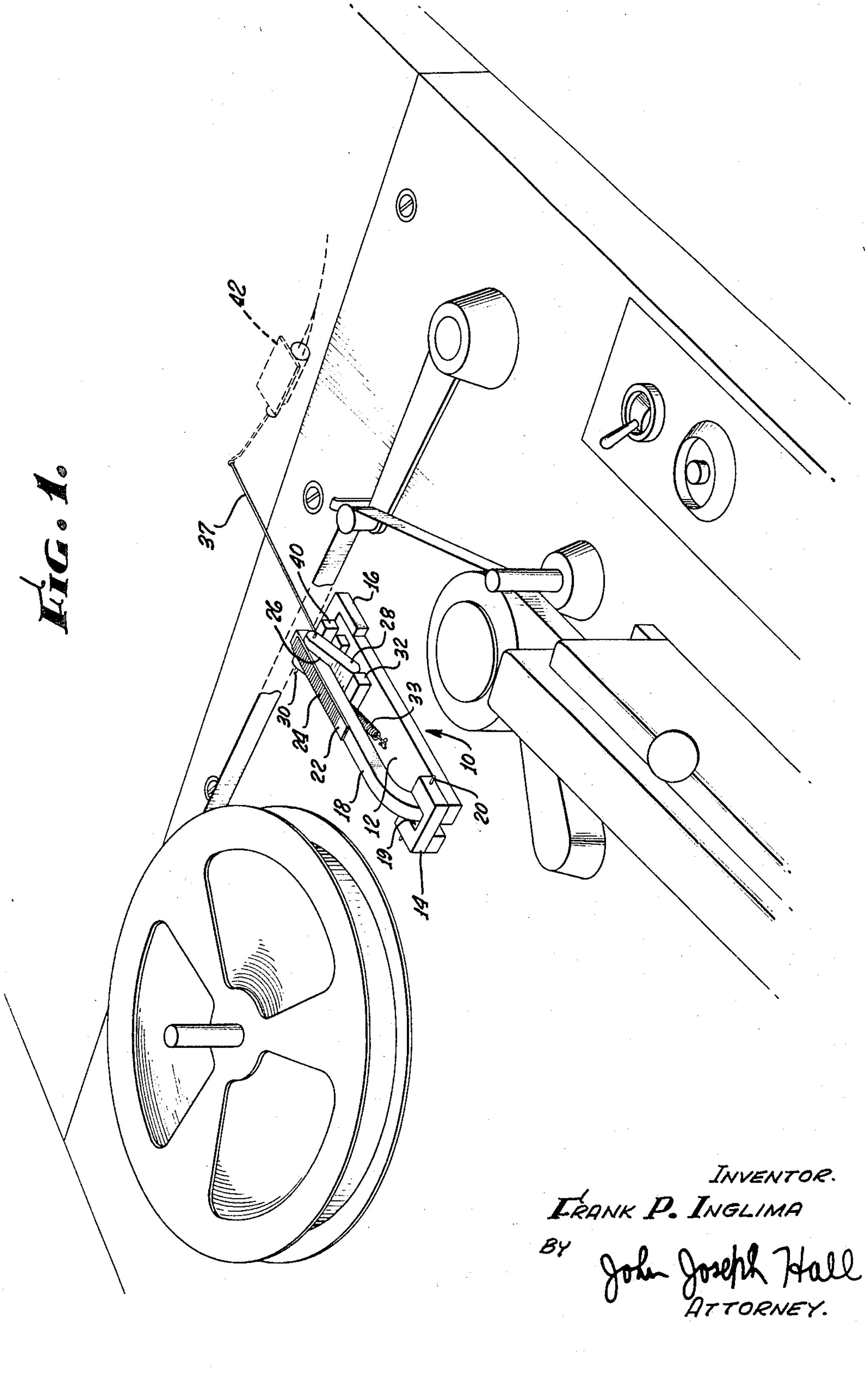
Figure 1A:
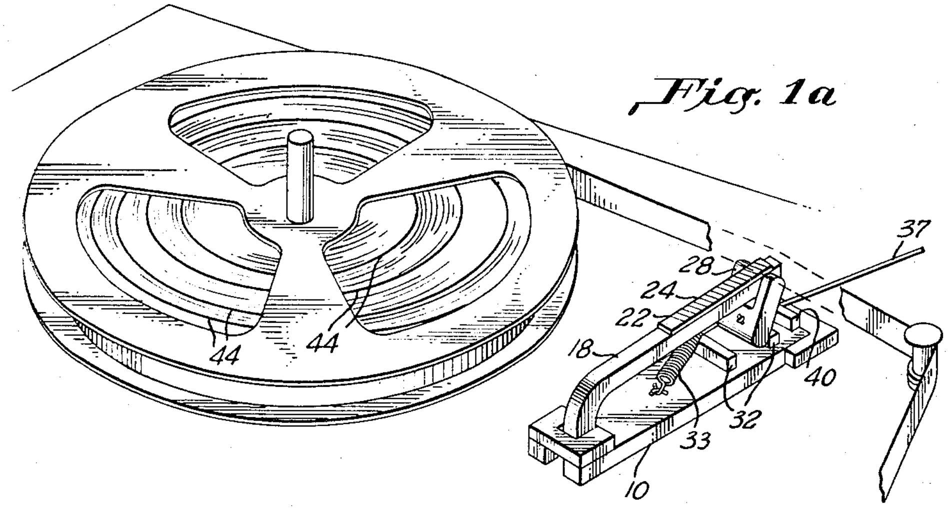

The amount of tape so raised depends upon the length of time that the tape rise arm 18 remains in the up position. Such portions of tape so raised are identified in FIGURE 1*a* by the numerals 44.

After the tape has been sufficiently marked in this manner, the button of the power supply is released, thereby deactivating the solenoid 42 and removing any pull from the string 37 on the tape rise lever 28.

Return spring 33 then pulls the tape rise arm 18 back to its original position. Return spring 33 should have sufficient tension to pull the tape rise arm 18 back and yet should allow the tape arm 18 to rise when pulled by string 37 upon activation of the solenoid 42.

In cases where the power supply fails or is unavailable, it is obvious that the operator of the tape indicator may pull the string 37 to operate the tape indicator.

The position mount block 16 may be permanently mounted on the deck of a conventional tape recorder, thereby allowing the tape indicator 10 to be removable and at the same time to be repositioned accurately upon use of the particular tape recorder.

In this manner, any number of locations may be identified by the slight rise in position of the section of tape so marked on the take-up reel. Thus, by use of the tape indicator, future reference of a particular portion of recorded tape is quickly and easily available upon demand.

Although I have described a preferred embodiment of my invention, it is understood that numerous variations in the details of construction and arrangement of parts may be made without departing from the spirit and scope of the invention as claimed hereinafter.

I claim:

1. A tape indicator for indicating various locations of material recorded on a magnetic recording tape comprising, a base member, a tape positioning arm, said arm having a curved end portion and an opposite straight end portion, means pivotally mounting said curved end portion to one end of said base, an elongated strip member formed with a plurality of transverse substantially parallel grooves positioned on said straight end portion each of said grooves sequentially accommodating an edge of said tape as said tape is reeled on a take-up reel, a pair of spaced limit block members mounted on said base remote of said curved end portion, a rocker member freely positioned between said limit blocks, and having a recessed free end portion; said straight end portion pivotally mounted in said recess; spring means connected to said arm and said base to downwardly bias said arm and said rocker member to a normal rest position, flexible actuating means connected to said rocker member to pivot said rocker member from said rest position to raise said arm whereby said tape is raised from its normal feed path thus forming a misaligned ruled indicating portion on the take-up reel.

2. A tape indicator according to claim 1 in which the flexible means for raising the tape positioning arm comprises a string means connected to a solenoid which is activated by a remote power supply.

References Cited

UNITED STATES PATENTS

| | | | |
|---|---|---|---|
| 1,803,241 | 4/1931 | Finkel | 116—67.2 |
| 2,243,624 | 5/1941 | Gazet | 242—157.1 |
| 2,853,042 | 9/1958 | Rivkin | 116—67.2 |

FOREIGN PATENTS

| | | |
|---|---|---|
| 794,874 | 5/1958 | Great Britain. |

LOUIS J. CAPOZI, *Primary Examiner.*